Dec. 7, 1948. R. F. DAVIS 2,455,565
VERTICAL AXIS CONE AND SHELL MILL
Filed May 6, 1946
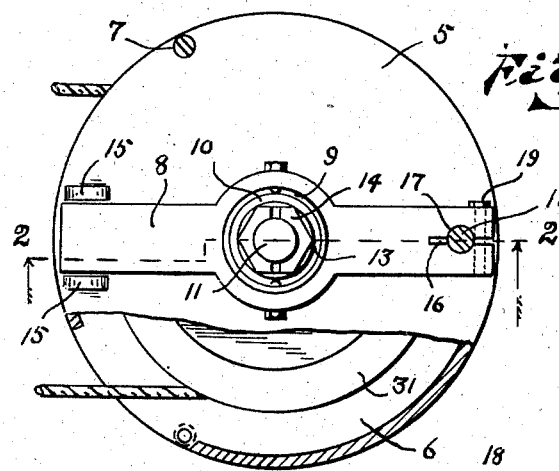
INVENTOR.
Robert F. Davis.
BY Geo. Stevens
atty.

Patented Dec. 7, 1948

2,455,565

UNITED STATES PATENT OFFICE 2,455,565

VERTICAL AXIS CONE AND SHELL MILL

Robert F. Davis, Hibbing, Minn.

Application May 6, 1946, Serial No. 667,558

2 Claims. (Cl. 241—258)

This invention relates to a grinding or pulverizing mill and has special reference to that type of small mill such as used in testing laboratories in the grinding and pulverizing of iron or other ores prior to analyzing same.

This general type of small mill is quite old and in common use, however quite crudely assembled and of common noisy bevel gear power transmission parts and with crude means for compensating for wear and adjustability. The principal object of the instant invention is to provide a much more satisfactory instrumentality of greater longevity and much finer adjustment for uniformity of product than the common type of mill.

An important feature of the invention is the bearing assembly for the main arbor or shaft of the mill whereby a single lubrication may safely last for several months' continuous operation of the mill.

Another feature is the simple and efficient adjustment of the adjacent grinding surfaces of the plates which is readily accomplished by the manipulation of but a single conveniently located thumb screw.

Other objects and advantages will appear in the further description of the invention.

In the accompanying drawing, forming part of this application,

Fig. 1 is a top plan view of the improved mill, with a portion of the upper part of the housing broken away, Fig. 2 is a vertical sectional view on the line 2—2, Fig. 1, Fig. 3 is a transverse sectional view on the line 3—3, Fig. 2, rotated 180°.

Fig. 4 is a broken elevational view of the lower portion of the mill housing showing the entrance to the grinding pit thereof, Fig. 5 is a slightly enlarged central sectional view of the oil ring intermediate of the lower extremities of the sleeves 22 and 23 and about the arbor 12.

In the drawings, the main housing of the mill comprises the upright hollow cylindrical portion 1 having formed integral therewith the supporting bracket-like portion 2 parallel therewith and the somewhat pear-shaped material receiving chamber 3, this latter chamber being provided with the usual opening in one side of the upper portion thereof through which the material to be ground, but which in this instance and especially for sanitation purposes, is provided with the gravity door 4.

The cover or top portion of the housing is in the form of the hollow cap-like inverted member 5, circular in plan view to neatly set down upon the similarly shaped flanged terminus 6 of the portion 1, and which cap is removably held in position upon the flange 6 by any desired number of bolts such as indicated at 7. This is surmounted by the freely movable transverse adjustment arm 8 which will be described more specifically later except that centrally thereof and within the through hole 9 therein is rockably supported the ball bearing cup 10 for suspension of the upper end 11 of the grinding arbor 12 and upon which upper threaded end is mounted the ball thrust bearing 13. Above this bearing and screw threadedly mounted upon the portion 11 is the adjustment nut 14 which has a lower conically shaped face to neatly fit within the rounded face of the inner edge of the upper raceway of the bearing 13.

Here it is to be noted that the arm 8 is free of movement with one end loosely resting intermediate of the two up-standing lugs 15—15 formed integral with the cap 5 adjacent the peripherally upper edge of the cap 5 while at the opposite end the lever 8 is bifurcated as at 16 through the hole 17 in which the thumb bolt 18 is mounted and outwardly of which hold the split end of the arm 8 is provided with a small tightening bolt 19 so that the normally fixed bias of the thumb nut may be readily predetermined.

The opposite lower end of the arbor 12 is also reduced and somewhat tapered as at 20 and carries thereupon the lowermost frustro-conically shaped grinding plate 21 as is common in such mills.

The elongated larger intermediate portion of the arbor 12 is rotatably carried within the elongated sleeve or bushing 22 which is fixed within the cylindrical portion 1 of the housing and is removably telescoped within a similar sleeve 23 and which sleeve is provided with an elongated fixed key 24 slidably operable within the keyway 25 in said arbor 12, this being to permit of ready downward removability of the arbor when other attachments thereupon are removed as for renewal, repair, or the like, and also free more delicate longitudinal adjustability of the arbor in relation to the size of pulverized product desired.

As a staunch and dependable bearing for the arbor 12, the opposite ends of the bearing sleeve 22 are stepped for reception of the outer races of the beveled roller bearings 26 at the upper end and 27 at the lower end and the opposite ends of the sleeve 23 are also somewhat similarly stepped to permit of the application of the same roller bearings, these bearings being of the inclined raced type as clearly shown affording convenient adjustment thereof to compensate for wear by the movement, in this instance, of the inner race of said bearings by the shortening of the stepped area intermediate of the inner races of said bearings. This shortening process is accomplished when necessary by the adjustment of the flat ring nut 28 locked in position by the like nut 29 both of which are threadedly mounted upon the uppermost stepped portion of the sleeve 23 thus providing most convenient and positive means for the simultaneous adjustment of both of said bearings, it being understood that a suitable spring ring lock as shown at 30 is installed within a suitable groove about the sleeve 23 for normally holding the lower bearing 27 in place.

Upon the upper end of the sleeve 23 and thereabouts is installed as by keying or threading the V transmitting pulley. Thus the most modern and silent means of furnishing power to such a mill is provided, the same being as by a belt associated with said sheave or pulley 31.

It being very essential to prevent any foreign substance such as oil or the like entering the grinding pit, I have provided adequate means in the way of an efficient oil ring as shown in Fig. 5 wherein 32 represents a preferably rectangular shaped hollow metal ring containing a specially shaped leather or other suitable gasket 33 having a central upstanding portion biased axially as indicated at 34 for contacting the outer walls of, and about the arbor 12. 35 represents an endless helical contractive spring member for installation within the keeper ring 32 before application of the oil ring to the arbor 12 and which is held against accidental removal as soon as the ring is applied about the arbor as clearly obvious.

In Fig. 4 is illustrated a convenient form of holding means for the product pan 36 adjacent the cut-away recesses 37 on opposite sides of the outer wall of the pit 3 for the holding bolts of the upper-most grinding ring 38, one of which bolts is shown at 39, said pan holding means comprising the bolt 40 impinging the fixed end of the arcuately shaped spring member 41 the free end of which is engaged by the opposed protruding pins 42, one on either side of the pan, obviously necessitating but a partial rotation of the latter for connection or release of same.

I claim:

1. As a new article of manufacture an ore grinding mill comprising a main housing having an upright hollow cylindrical portion and a lower material receiving chamber, said chamber having an opening in one side thereof for insertion of material to be ground, a bearing sleeve within said cylindrical portion of said housing and being of substantially the same length as said cylindrical portion, a pair of roller bearings carried one at each end of said sleeve, a second bearing sleeve rotatably carried intermediate of said roller bearings, said second sleeve extending upwardly beyond said first mentioned sleeve, a key fixed to said second sleeve and extending inwardly within the bore thereof, an arbor carried within said second sleeve and having a portion thereof extending outwardly therefrom at both ends, a keyway in said arbor leading from the upper end thereof downwardly to engage said key, a pulley fixed at the upper end of said second sleeve, said second sleeve and arbor being rotatable by said pulley, a grinding ring carried at the lower end of said housing, a grinding plate carried by said arbor at the lower end thereof and being rotatable therewith, said plate being cooperative with said ring to grind said material, a pan carried by the lower end of said housing to catch the ground material, and means for adjustably supporting said arbor within said second sleeve.

2. The structure as set forth in claim 1 and said last mentioned means comprising an adjustment arm carried above said pulley, a thrust bearing pivotally carried by said arm, the upper end of said arbor extending through said bearing, an adjustment nut carried on the end of said arbor upwardly of and by said bearing to support said arbor, and means carried by said arm for adjusting the vertical position of said arbor.

ROBERT F. DAVIS.

REFERENCES CITED

The following references are of record in the file of this patent:

UNITED STATES PATENTS

| Number | Name | Date |
|---|---|---|
| 249,110 | Shafer | Nov. 1, 1881 |
| 249,507 | Deubel | Nov. 15, 1881 |
| 324,181 | Smith | Aug. 11, 1885 |
| 679,775 | Pank | Aug. 6, 1901 |
| 1,066,220 | Quickel | July 1, 1913 |
| 1,405,878 | Torrance | Feb. 7, 1922 |
| 1,570,456 | Bryant | Jan. 19, 1926 |